June 26, 1962 F. KUHRT 3,041,416

TRANSDUCER SYSTEM FOR MAGNETIC SIGNALS

Filed May 13, 1959 2 Sheets-Sheet 1

TRANSDUCER SYSTEM FOR MAGNETIC SIGNALS

Filed May 13, 1959 2 Sheets-Sheet 2

United States Patent Office 3,041,416

Patented June 26, 1962

3,041,416

TRANSDUCER SYSTEM FOR MAGNETIC SIGNALS

Friedrich Kuhrt, Nurnberg, Germany, assignor to Siemens-Schuckertwerke Aktiengesellschaft, Berlin, Germany, a corporation of Germany Filed May 13, 1959, Ser. No. 812,915
Claims priority, application Germany May 22, 1958
7 Claims. (Cl. 179—100.2)

My invention relates to systems for the reproduction of, or response to, magnetic signals, comprising at least one magnetic signal transmitter and at least one transducer which receives the signals and translates them into an electric voltage. Such systems serve control or regulating purposes as exemplified by magnetic limit switches or other switching devices that are to operate on the proximity principle without the aid of movable switch contacts. Another application of such systems, also pertinent to my invention, is for the reproduction of magnetic signals recorded on wires, tapes or other carriers that travel relative to the transducer, as is the case with the reproduction of magnetic sound recordings.

It has been proposed to effect a response to magnetic signals, particularly for reproducing sound from magnetic tape recordings, by means of a pickup head in which a signal-responsive voltage is generated by a Hall generator rather than being induced in a coil of wire. Such hall generators, known as such, comprise an electrically resistive semiconductor wafer, the so-called "Hall plate," which has two terminal electrodes at opposite ends for passing a current through the plate, and which has two probe electrodes, called "Hall electrodes," usually located midway between the two terminal electrodes and spaced from each other in a direction transverse to the current axis defined by the two terminal electrodes. When the Hall plate is not subjected to a magnetic field having a field component perpendicular to the plane of the plate, the two Hall electrodes have both the same potential so that the voltage between them is zero. When a magnetic field is active, a voltage, called "Hall voltage," appears between the two Hall electrodes and, for a constant current flowing through the plate, is proportional to the intensity of the magnetic field.

With such Hall-voltage transducers, the response of the transducer is independent of the relative travelling speed between transmitter and transducer which is of advantage, for example, when using the transmitter-transducer system for proximity-switching or positioned-control purposes.

However, the Hall-voltage generating devices heretofore proposed for such transducer purposes leave much to be desired with respect to sensitivity and accuracy of performance; and it is an object of my invention to considerably improve a magnetic-signal transducer system of this type relative to these shortcomings.

According to my invention, the transducer for response to the magnetic signals of a signal carrier which is movable on a given path relative to the transducer or vice versa, consists of a pickup head which comprises a magnetizable core structure with two limbs forming between each other a narrow gap that faces the signal carrier along the path of relative motion; and I mount the Hall plate of a Hall-voltage generator directly in the just-mentioned gap.

The signal transmitter or carrier for cooperation with such a pickup head may consist essentially of two permanent magnets which are mounted closely adjacent to each other and form together a narrow intermediate field gap. However, the signal transmitter may also consist of a thin strip, having about 10 micron thickness for example, which consists of permanent-magnetic material and is magnetized in its longitudinal or transverse direction. Such transmitters are particularly suitable for control or regulating purposes where it is desired that the pickup head respond by an abrupt change in output voltage when the transmitter and the pickup head assume, or pass through, a position of proximity to each other. However, for other purposes the transmitter may also consist of a magnetogram carrier, for example a sound recording tape, which, if desired, permits changing the magnetic signals by erasing and re-magnetizing the carrier. A carrier of the latter type, generally suitable for the recording and reproduction of sound, may also be used for control purposes in which case the carrier may consist of non-magnetizable material provided with local coatings or attachments of magnetic character to form the signals. In each of these cases of proximity response, the occurrence of a zero passage or maximum of the Hall voltage at the point of exact proximity between transmitter and transducer can be utilized with great accuracy.

The Hall plate of a pickup head according to the invention, mounted directly in the active gap of the head facing the signal carrier, is preferably embedded between two small ferromagnetic cover plates of high permeability. These magnetizable plates, serving as pole pieces, are preferably made of ferrite in order to also serve insulating purposes. The transducer may be placed in contact with the signal carrier, for example a recording tape, so that the gap and the Hall plate extend substantially in a plane transverse and perpendicular to the relative travel path.

In some cases it is of advantage to provide auxiliary means for securing a direct, magnetically active engagement of the pickup head with the tape, so that the Hall plate virtually engages the signal carrier at one of its edges where a Hall electrode is located. To make this possible, the electric lead of the lower Hall electrode, i.e. the electrode adjacent to the carrier when the pickup head is placed from above onto the carrier, may consist of a soft-iron wire embedded in one of the above-mentioned ferrite cover plates.

According to another feature of my invention it is of advantage to design the lead of the other Hall electrode as an electrolytically deposited strip of good conducting metal, such as silver, which extends in a shallow groove over the front surface of the pickup head. The shallow groove, having a depth of a few microns for example, protects the electrolytically deposited lead of the lower Hall electrode from frictional wear. However, the electrode leads may also consist of thin strips of conducting material, for example silver, which form an extremely thin coating produced by precipitating the conductor material from the vaporous state. Such conductor strip may also be produced by various other methods, including the use of colloidal solutions of silver or other conducting material, or suspensions of such materials in finely distributed form, within a solvent readily evaporable by heat. After depositing the solution or suspension, a conducting strip-shaped electrode lead of slight thickness can be formed simply by heating. In all such cases, the semiconducting material of the Hall plate can be kept insulated from the leads by vaporizing onto the semiconductor surface an insulating coating, preferably of silicon oxide, before depositing the conductor material.

The width of the field gap formed between the two cover plates or pole pieces of ferrite is a determining factor for the upper limit frequency of the pickup head with respect to a given relative travelling speed between signal carrier and pickup head. However, due to the porosity of the ferrite pieces, the effective gap is considerably wider than the geometrically measured gap. Depending upon the structure of the pole pieces and the width of the geometrically measured gap, the effective gap width may amount up to twice the measured width of the gap. This applies not only to pole pieces of ferrite but is generally applicable to porous materials.

According to another feature of my invention therefore, the width of the effective gap, when using pole pieces of ferrite or other porous materials, is still further reduced by embedding or placing the Hall plate between thin sheet-metal pieces of soft-magnetic material. Preferably suitable as such material are ferromagnetic alloys of a slight thermal coefficient of expansion. The thickness of the sheets is preferably between 0.1 and 0.5 mm.

The invention will be further described with reference to the embodiments illustrated by way of example on the accompanying drawings in which.

Figures 1, 1A, 2:
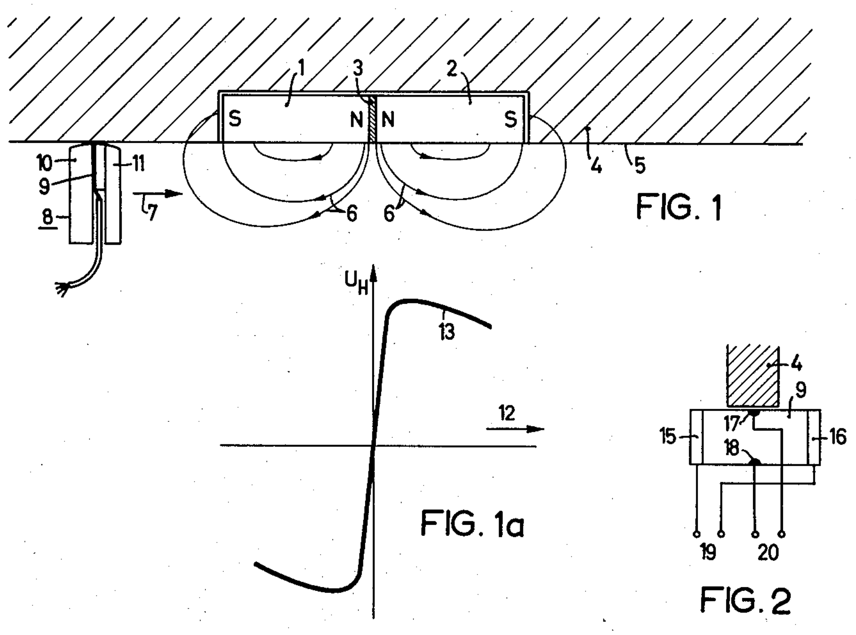
FIG. 1 illustrates schematically a magnetic-signal responsive transducer system applicable for proximity-dependent control operations.
FIG. 1*a* is a graph showing a typical transducer output voltage as occurring in such a system.
FIG. 2 is a schematic diagram of a Hall plate as used in the pickup head according to FIG. 1.

According to FIG. 1 the signal transmitter consists essentially of two permanent magnets 1 and 2 which are mounted in aligned relation to each other with mutually opposed polarities. The two magnets 1 and 2 are cemented or otherwise fastened together so that a non-magnetic intermediate layer 3 remains as a field gap of slight thickness, for example 10 microns. The transmitter assembly is inserted into a non-magnetic glide-way structure 4 whose surface 5 is ground or otherwise smoothened in order to serve as a glide surface for the pickup head. The magnetic lines of force are symbolically illustrated by arrows 6.

A pickup head 8 is movable in the direction of the arrow 7 along the glide-way surface 5. The pickup head comprises a core structure of high permeability which forms an effective gap at the side facing the transmitter immediately adjacent to the glide-way. The magnetizable structure in the illustrated embodiment comprises two limbs consisting of ferrite plates 10 and 11 which form between each other the above-mentioned gap so that the gap extends perpendicular to the travelling path and in a direction transverse to the travelling direction indicated by the arrow 7. The width of the gap may be 10 microns, but is preferably smaller than 10 microns. The Hall plate 9 is located directly in the gap so that its plane also extends perpendicular to the travelling direction and transverse thereto.

FIG. 1*a* represents the curve 13 of the output voltage $U_H$ produced by the pickup head in relation to the travelling path. When the Hall plate passes through a location near the narrow intermediate layer 3 between the two permanent magnets 1 and 2, the Hall voltage passes abruptly through the zero value. This zero passage can be utilized as a control command, for example by means of a switching amplifier connected to the pickup.

As schematically shown in FIG. 2, the semiconductor wafer of the Hall plate 9 is provided with two terminal electrodes 15 and 16 at opposite ends and has two point electrodes or other probe electrodes 17 and 18 midway between the terminal electrodes 15, 16 and spaced from each other in a direction transverse to the spacing direction of the electrodes 15, 16. The Hall plate 9 consists preferably of a semiconductor compound of higher carrier mobility than germanium. Indium antimonide (InSb) or indium arsenide (InAs) are eminently suitable for this purpose. The terminal electrodes 15 and 16 are connected at 19 to a source of energizing current which, for the control purposes above mentioned consists of a constant direct current. The Hall voltage, represented by curve 13 in FIG. 1*a*, is taken from across the Hall electrodes 17, 18 at the output terminals denoted by 20. It will be noted that the Hall plate 9 has its one edge that is provided with the Hall electrode 17, located immediately adjacent to the signal carrier or glide-way structure 4.

Figure 3:
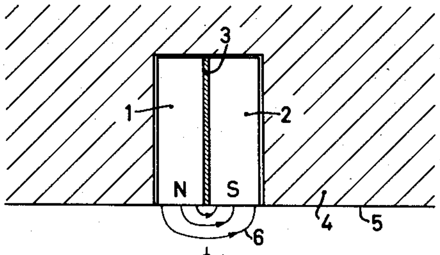
FIG. 3 shows schematically a signal transmitter of different design applicable in a system otherwise similar to FIGS. 1 and 2.
Figure 3A:
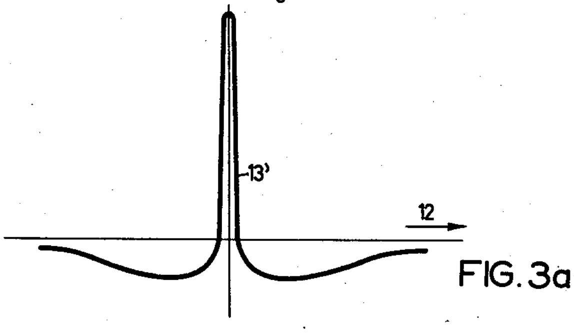
FIG. 3*a* is a graph indicating a typical pickup output voltage as obtainable with a transmitter according to FIG. 3.

The two permanent magnets 1 and 2 in the glide-way structure 4 may also be arranged as shown in FIG. 3. In this embodiment the two magnets have poles of different polarity located adjacent to each other. The magnetic field is such that the Hall voltage, represented by curve 13' in FIG. 3*a*, passes through a sharply peaked maximum when the gap and Hall plate of the pickup are in proximity of the intermediate layer 3.

When using, in lieu of the two permanent magnets, an erasable magnetic-signal carrier which extends along the glide path, then the magnetic impulse having a width of a few microns can be placed upon the tape by means of an ordinary recording head. In this case, however, the smaller magnetic signal flux results in obtaining in the receiving pickup a signal of considerably smaller intensity than when using permanent magnets.

Figures 4, 5:
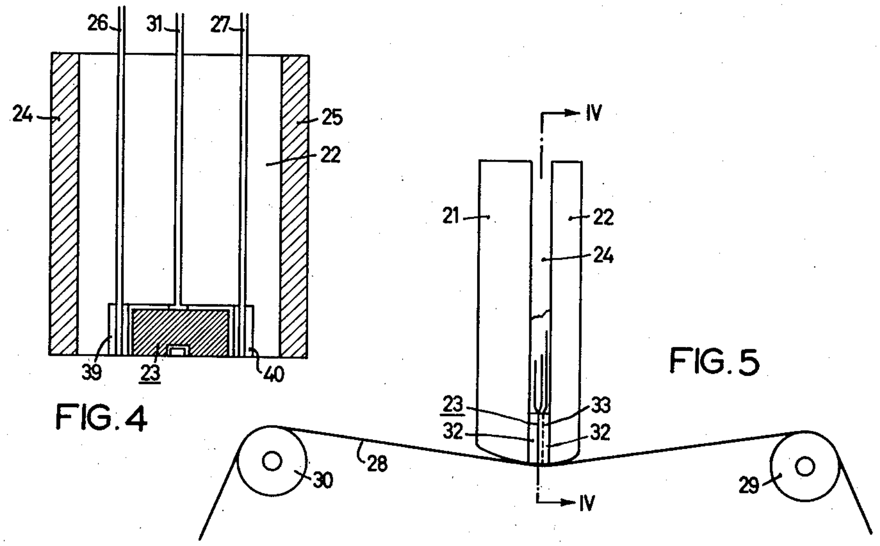
FIG. 4 is a sectional view of a pickup head similar to the one shown in FIG. 1.
FIG. 5 shows a lateral view of a pickup head according to FIG. 4 in conjunction with a magnetic recording tape.

The pickup head shown sectionally in FIG. 4 is particularly designed for operation with magnetic tape. One of the two ferrite plates 22 is visible in this illustration, both ferrite plates 21 and 22 with the intermediate Hall plate 23 being apparent from FIG. 5. Denoted by 24 and 25 are non-magnetic spacer strips. The current supply leads 26 and 27 extend through the space between the two ferrite plates. The signal carrier consists of a tape 28 which is guided over rollers 29 and 30 so that the two ferrite plates are located above the tape which engages the lower ends of both plates.

One of the two leads of the Hall electrodes, namely the one denoted by 31, extends from above directly to the upper edge of the Hall plate 23. The lead of the lower Hall electrode, however, is designed in a particular manner in order to permit a direct magnetically active engagement of the head with the tape. In the embodiment of FIGS. 4 and 5 the lead connected to the lower Hall electrode is designed as a soft-iron wire 33 which is embedded in the ferrite cover plate 32.

Figure 6:
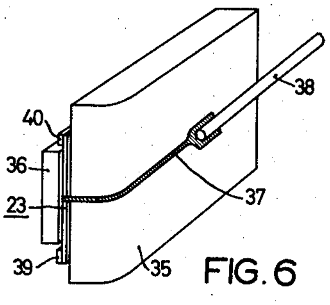
FIG. 6 is a schematic perspective view of part of a modified pickup head.

The embodiment illustrated in FIG. 6 exemplifies another way of mounting the lead for the lower Hall electrode in such a manner that a direct magnetic contact of the pickup head with the recording tape is secured. The semiconductor layer 23 is in face-to-face contact with a ferrite base plate 35 and is covered on the opposite side by a ferrite cover plate 36. As in the other embodiments, the ferrite plates may be substituted by plates of a different suitable material of high permeability. The illustration shows perspectively the bottom side of the pickup head, that is the side facing the magnetic recording tape and resting upon the tape when in operation. Shown at 37 is an electrolytically deposited connection from the semiconductor 23 to the Hall-electrode wire 38. This connection, consisting for instance of a strip of deposited silver, is located in a groove or other recess at the surface of the ferrite base plate. The terminal electrodes for passing current through the Hall plate are denoted by 39 and 40.

Figure 7:
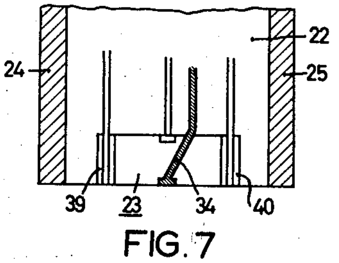
FIG. 7 is a sectional view similar to FIG. 4 but embodying a different modification of the Hall-generator leads.

In the embodiment shown in FIG. 7, still another way of connecting the lower Hall electrode with the appertaining lead is employed. According to FIG. 7, in which the same reference numerals are used as in FIGS. 4 and 5 for respectively corresponding elements, a thin strip 34 of copper or silver serves as an electrode lead. The strip 34 is deposited by vaporization, cathode scattering or similar depositing methods. The necessary electric insulation between the semiconductor layer 23 and the lead 34 is obtained by vaporizing a silicon oxide coating onto the semiconductor surface before applying the lead 34. A pickup of such design is particularly well suitable for reproducing acoustic recordings. Since the output circuit of the pickup head is purely ohmic and is capable of delivering a power output that can be subjected to load current, the output voltage can be used for direct control of a current amplifier, which makes it possible to connect the pickup with a transistor amplifier without need for intermediate voltage amplification.

Figure 8:
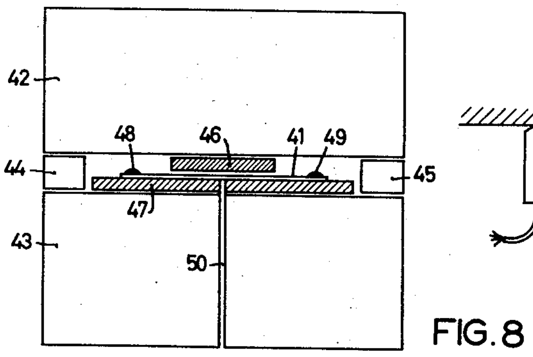
FIG. 8 shows schematically and partly in cross section a view onto the tape-engaging end of a pickup head according to the invention for use with magnetic recording tapes.

In the embodiment according to FIG. 8 the Hall plate consists of a thin wafer or layer 41 of a suitable semiconducting compound, particularly of the type $A_{III}B_{V}$. Compounds of this type consist of an element of the third group in the periodic system with an element of the fifth group, indium arsenide or indium antimonide being particularly well suitable.

The two pole pieces 42 and 43 consist of ferrite or other high-permeable material and are kept rigidly at a given distance from each other by means of spacer pieces 44 and 45 of non-magnetizable material. Located between the semiconductor wafer 41 and the ferritic pole pieces are thin metal sheets 46 and 47 of soft-magnetic iron which may have a thickness of about 0.3 mm., for example. The sides of the sheet members facing the semiconductor wafer 41 are preferably coated with a thin coating of insulating material. Such an insulating coating is preferably given a thickness not more than about 1 micron. The insulating coatings may be formed of silicon oxide, aluminum oxide or the like, and the insulating substances may be deposited by vaporization or other known and suitable methods. The Hall plate is provided with terminal electrodes 48 and 49 for supplying electric current. The one Hall electrode lead 50 located on the front side of the pickup, facing the signal carrier, consists of a strip 50 of conducting material electrolytically deposited in a groove of the ferrite plate 43, substantially as described above with reference to lead 37 in FIG. 6.

Figure 9:
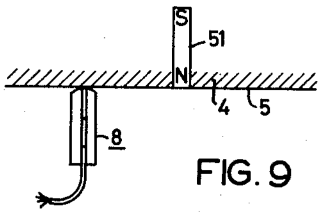
FIG. 9 illustrates a modification of signal transmitting means applicable with a pickup head according to the invention.

The embodiment illustrated in FIG. 9 differs from those described with reference to FIGS. 1 and 3 in that the signal transmitter comprises a narrow strip 51 of permanent-magnetic material which is magnetized in the longitudinal or transverse direction and is embedded in the glide-way structure 4. When the pickup head 8 passes by, or is located near, the member 51, a peaked Hall voltage is produced similar to the one represented by curve 13' in FIG. 3*a*. The system is suitable mainly for positional control purposes as described above.

Since a pickup head according to the invention responds to the magnetic induction itself and not to the rate of change of the magnetic induction, such a pickup head can be used for static response to magnetic signals. This is of particular advantage, for example, when using the device for automatic control purposes such as for the programming of manufacturing machinery, particularly machine tools. Consequently the invention is advantageously applicable not only for sound-reproducing purposes where a high-quality frequency characteristic is required, but also for measuring, control and regulating purposes, particularly where very slow changes of magnetic induction must be coped with. Such conditions are encountered, for example, in cases where the magnetic record represents measuring values which must be reproduced mainly in accordance with the intensity of the magnetic induction itself, rather than in dependence, or exclusive dependence, upon the rate of inductance change.

In the control of machine tools or other fabricating equipment in which programming commands are represented in form of magnetic signals on a signal carrier, the travelling motion of the carrier relative to the pickup head may be given a variable speed including, if desired, the case of complete standstill, without impairing the response to the signal transmission. Further applications include the field of telegraphy techniques. Of particular advantage for a static response is the fact that the output voltage of the pickup head can be modulated by passing, instead of a constant direct current, an alternating current of the desired modulating frequency through the terminals 19 (FIG. 2) of the Hall plate. In this case the output voltage at terminals 20 is an alternating voltage of the same frequency upon which a modulation is imposed in accordance with the magnetic signals responded to.

Also by virtue of the fact that the pickup head responds to magnetic induction itself, the invention affords a particularly favorable reproduction of low-frequency signals when operating with sound recordings such as magnetic recording tape or the like. With the known pickup heads of the inductive type, the desired frequency fidelity of the output voltage is difficult to obtain over the entire audible frequency spectrum, and the defective frequency characteristic must be corrected in an amplifier by particular distortion-eliminating means. In contrast, a Hall-voltage generating pickup head according to the invention has an inherently good frequency characteristic, due to the fact that the Hall plate is located directly in the active gap of the pickup head facing the signal carrier.

For a given travelling speed of the recording tape in a sound reproducer, the upper limit frequency is determined by the gap width of the pickup head. The smaller the width of this gap, the higher is the limit frequency. With inductive pickups, however, the efficiency greatly decreases with a decreasing gap width so that the gap width cannot be reduced at will. The same reduction in efficiency occurs with Hall-voltage generating pickups as heretofore proposed in which the Hall generator is mounted in the upper portion of an essentially C-shaped magnetizable core, so that the plate was located remote from the signal carrier. In contrast thereto, a considerably improved efficiency is obtained in a pickup head according to the invention, also by virtue of the fact that the Hall plate is located in the lower gap facing the signal carrier and adjacent thereto. These features obviate the above-mentioned decrease in efficiency occurring in the known pickups when the gap width is made very small. In the pickup head according to the invention, the reduction in gap width causes the magnetic flux to be better "drawn off" and directed through the Hall plate. This permits the provision of extremely narrow gaps so that, on the one hand, the upper limit frequency is very high and, on the other hand, the upper as well as the lower limit frequencies remain well responded to so that high efficiency is secured throughout the entire frequency range. This, in sound reproducing devices, is tantamount to permitting a considerable reduction in tape travel speed in comparison with the tape speeds heretofore customary with inductive pickup heads.

The gap, as a rule, is made so narrow at the place of engagement with the signal carrier that the effective gap width is smaller than 4 microns. However, still smaller gaps are preferable. When using Hall plates produced by vapor-deposition of semiconductor substance, or by grinding a semiconducting crystal layer and subsequently reducing its thickness by electrolytic etching, an effective gap width down to approximately one micron can be produced. With the aid of such a pickup head, the limit frequency can be raised or, as mentioned, the tape travel speed can be reduced. The former advantage is of particular value for magnetically storing television programs or other phenomena requiring a high limit frequency. Many such problems have heretofore failed to find a satisfactory solution because, with inductive pickup heads, it would be necessary to operate with unacceptably high tape speeds to afford recording and reproducing the high frequencies.

It will be obvious to those skilled in the art, upon studying this disclosure, that my invention permits of various modifications with respect to the design of the magnetic-signal carrier and pickup head, and may be employed for purposes other than particularly illustrated and described herein, without departing from the essential features of my invention and within the scope of the claims annexed hereto.

I claim:

1. A magnetic signal carrier and a pickup head for response to magnetic signals issuing from said signal carrier along a given path of relative motion, comprising magnetizable structure having two magnetizable plates of ferrite material with respective parallel planar surfaces located opposite each other and forming a narrow essentially planar gap facing said path of relative motion and extending at a right angle thereto, a Hall plate of semiconductor material mounted in said gap, said Hall plate having two current supply terminals on two opposite edges respectively to define a current axis transverse to the direction of said relative motion and within said gap and generally parallelly of the surface of the signal carrier, and two Hall voltage take-off electrodes on the other two respective edges for producing between said two Hall electrodes a Hall voltage in response to the magnetic signals, one of said other two edges being located within said gap and at the gap side which faces said signal carrier and extending transverse to said path, the other of said two other edges being the edge that is remote from the signal carrier, said gap having at the side facing the signal carrier an effective width not greater than four microns, said Hall plate comprising a coating of semiconductor material on one of said ferrite plates.

2. The invention defined in claim 1, the Hall plate being formed of a semiconductor compound of higher carrier mobility than germanium, taken from the group consisting of indium antimonide (InSb) and indium arsenide (InAs).

3. The apparatus defined in claim 1, and a lead connected to the said one Hall voltage electrode, said lead being embedded in the ferrite, the signal carrier being a magnetic tape.

4. The apparatus defined in claim 1, the signal carrier being a magnetic tape, and a lead connected to the said one Hall voltage electrode, said lead being located in a groove formed in a side of one of the ferrite plates facing said magnetic signal carrier, which side forms a glide surface.

5. The apparatus defined in claim 1, and two metal sheets of soft-magnetic metal interposed between said Hall plate and said ferrite plates respectively, said sheets having a thickness not more than 0.5 millimeter.

6. The apparatus defined in claim 1, the magnetic signal carrier being a magnetic tape.

7. The apparatus defined in claim 1, and a soft-iron lead connected to said one Hall voltage, said lead being embedded in the ferrite, the signal carrier being a magnetic tape.

References Cited in the file of this patent

UNITED STATES PATENTS

| | | |
|---|---|---|
| 2,866,013 | Reis | Dec. 23, 1958 |
| 2,900,451 | Havstad | Aug. 18, 1959 |
| 2,978,545 | Howling | Apr. 4, 1961 |

FOREIGN PATENTS

| | | |
|---|---|---|
| 38,962 | Germany | Sept. 13, 1956 |